(12) United States Patent
Liu et al.

(10) Patent No.: US 9,303,155 B2
(45) Date of Patent: Apr. 5, 2016

(54) GRAPHENE OXIDE/POLYMER COMPOSITION FOR MANUFACTURING INNER LINERS AND INNER TUBES OF TIRES AND METHOD FOR PREPARING THE SAME

(71) Applicant: BEIJING UNIVERSITY OF CHEMICAL TECHNOLOGY, Beijing (CN)

(72) Inventors: Li Liu, Beijing (CN); Yingyan Mao, Beijing (CN); Zhiqiao Kuang, Beijing (CN); Junlei Cui, Beijing (CN); Ying Xu, Beijing (CN); Fazhong Zhang, Beijing (CN); Shipeng Wen, Beijing (CN); Liqun Zhang, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 0 days.

(21) Appl. No.: 14/325,323

(22) Filed: Jul. 7, 2014

(65) Prior Publication Data
US 2014/0309331 A1     Oct. 16, 2014

Related U.S. Application Data

(63) Continuation-in-part of application No. PCT/CN2012/086497, filed on Dec. 13, 2012.

(30) Foreign Application Priority Data

Jan. 19, 2012   (CN) .......................... 2012 1 0017703

(51) Int. Cl.
| | | |
|---|---|---|
| C08K 3/04 | (2006.01) |
| C08L 9/06 | (2006.01) |
| C08L 15/00 | (2006.01) |
| B60C 1/00 | (2006.01) |
| C08L 21/00 | (2006.01) |
| C08L 7/02 | (2006.01) |
| C08L 9/10 | (2006.01) |
| C08L 77/06 | (2006.01) |
| C08C 19/06 | (2006.01) |

(52) U.S. Cl.
CPC .................. *C08L 9/06* (2013.01); *B60C 1/0008* (2013.04); *C08L 7/02* (2013.01); *C08L 9/10* (2013.01); *C08L 15/00* (2013.01); *C08L 21/00* (2013.01); *C08L 77/06* (2013.01); *C08C 19/06* (2013.01)

(58) Field of Classification Search
CPC ............. C08K 3/04; C08K 3/20; C08L 15/00
USPC .......................................... 523/348; 524/526
See application file for complete search history.

(56) References Cited

U.S. PATENT DOCUMENTS 5,910,544 A * 6/1999 Ozawa ...................... B60C 1/00
                                                            525/178

\* cited by examiner

*Primary Examiner* — Edward Cain
(74) *Attorney, Agent, or Firm* — Matthias Scholl, PC; Matthias Scholl

(57) ABSTRACT

A composition for manufacturing the inner liners and inner tubes of tires, and a method of preparing the same. The composition includes the following two phases: A) a continuous phase of a composition of graphene oxide/rubber including graphene oxide, a reactive rubber, and a solid rubber; and B) a dispersion phase of an epoxy natural rubber or a thermoplastic resin. In the composition of graphene oxide/rubber, the graphene oxide leads to low gas permeability and remarkably reinforces the rubber composition. The epoxy natural rubber or thermoplastic resin is dispersed in the composition of graphene oxide/rubber and forms an islands-in-the-sea structure. The composition has low gas permeability, excellent mechanical properties, and flexibility, and is adhesive to adjacent rubber.

10 Claims, No Drawings

US 9,303,155 B2

GRAPHENE OXIDE/POLYMER COMPOSITION FOR MANUFACTURING INNER LINERS AND INNER TUBES OF TIRES AND METHOD FOR PREPARING THE SAME

CROSS-REFERENCES TO RELATED APPLICATIONS

This application is a continuation-in-part of International Patent Application No. PCT/CN2012/086497 with an international filing date of Dec. 13, 2012, designating the United States, now pending, and further claims priority benefits to Chinese Patent Application No. 201210017703.6 filed Jan. 19, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a novel composition for manufacturing inner liners and inner tubes of tires and tires prepared from this composition. This composition contains an islands-in-the-sea structure in which a continuous phase is a composition of graphene oxide/rubber and a dispersed phase is epoxy natural rubber or thermoplastic resin.

2. Description of the Related Art

Inner liners of tires must be produced from soft materials that have low air permeability. Low air permeability not only maintains stable air pressure within the tires so as to ensure safe driving, but also reduces the rolling resistance of the tires. In addition, reducing the thickness of the inner liners leads to decreased fuel consumption. Butyl rubber reinforced with carbon black and halogenated butyl rubber are the most commonly used compositions for manufacturing inner liners of tires, which, however, are expensive. On the contrary, general-purpose rubber is cheap and more adhesive to the tire body. Therefore, in current trends of developing compositions for manufacturing inner liners of tires, general-purpose rubber is often used as the substrate and is reinforced by fillers or modifiers so as to achieve low air permeability while not decreasing the flexibility of the rubber.

Compositions containing general-purpose rubber as the substrate have been utilized for manufacturing inner liners of tires. International Application No. PCT/US94/03711 recites manufacturing inner liners from a composition containing general-purpose rubber and silicate clay. However, one of the disadvantages of this technique is that the air permeability of the composition is inadequately high when the content of silicate of the composition is low; and the composition becomes too rigid to manufacture inner liners when the content of silicate is high. Korea Patent No. 1999-36051 recites a composition for manufacturing inner liners that contains a thermoplastic resin compound as a continuous phase and a rubber compound as a dispersed phase. In this composition, barrier resins in flat forms are dispersed in thermoplastic elastomers to form a thermoplastic elastomer composition with low air permeability. However, such a thermoplastic elastomer composition has low adhesion to adjacent rubbers so that an adhesive layer need to be added during manufacturing tires. In Application No. 201010591408.2, Sumitomo Rubber Industries, Japan recites a modified natural rubber composition which is filled with carbon black or silica and has a content of phosphorus of 200 ppm or less. Though this rubber composition has low air permeability, it is less flexible, leading to a larger thickness of the inner liners produced therefrom as well as difficulties in achieving lightweight of tires.

SUMMARY OF THIS INVENTION

In view of the above-described problems, it is one objective of the invention to provide a novel composition for manufacturing inner liners and inner tubes of tires. This composition contains an islands-in-the-sea structure in which a continuous phase is a composition of graphene oxide/rubber and a dispersed phase is epoxy natural rubber or thermoplastic resin. The composition of graphene oxide/rubber comprises graphene oxide, a reactive rubber that is capable of reacting with the functional groups on the surface of the graphene oxide to form ionic bonds or covalent bonds, and a solid rubber (rubber latex or dry rubber) having a good compatibility with the reactive rubber. The composition has excellent flexibility, low air permeability, and adhesion to adjacent rubbers for the following reasons:

1) in the phase of the composition of graphene oxide/rubber, ionization occurs at the oxygen-containing functional groups on the surface of graphene oxide and produces charges thereon. These charges on the surface of graphene oxide give rise to repulsion between the layers of graphene oxide that are peeled off from each other by ultrasonication. Due to the repulsion that is stronger than the bonding force between the layers of graphene oxide, the layers of graphene oxide are completely separated from each other. Meanwhile, the negative charges and oxygen-containing functional groups on the surface of graphene oxide are ionically or covalently bonded upon the reactive functional groups of the reactive rubber. As such, the graphene oxide is uniformly dispersed in the rubber composition, forming impermeable layers that hinder the passage of gas and rendering the composition of graphene oxide/rubber with low air permeability;

2) gas passes through rubbers via the irregular movement of gas molecules through the tiny gaps within the rubbers. Thus, a higher flexibility of rubbers leads to a higher speed of gas passing through the rubbers; conversely, a lower flexibility of rubbers leads to a lower passing speed of gas. In the composition of graphene oxide/rubber, graphene oxide is directly connected to the rubber's molecular chain mesh and limits the molecular movement thereof so as to further decrease the air permeability of the composition of graphene oxide/rubber; and 3) the dispersed phase is selected from the following two types of polymers:
   A) epoxy natural rubber: epoxy natural rubber (ENR) is natural rubber modified by grafting epoxy groups onto the double bonds of the molecular chains of the rubber. Introduction of the epoxy groups onto the rubber molecules increases the polarity and intermolecular forces thereof, rendering ENR air-impermeable; and
   B) thermoplastic resin: the thermoplastic resin which are air-impermeable includes polyethylene (PE), polyvinyl chloride (PVC), polystyrene (PS), polyamide (PA), polyoxymethylene (POM), polycarbonate (PC), polyphenylene ether, and polysulfone.

Epoxy natural rubber or thermoplastic resin is mixed with the composition of graphene oxide/rubber to from an islandsin-the-sea structure. The continuous phase is the composition of graphene oxide/rubber, in which the graphene oxide effectively reinforces the rubber and renders the rubber air-impermeable; the dispersed phase is the epoxy natural rubber or thermoplastic resin with low air permeability, which increases the flexibility of the rubber molecular chains in the continuous phase by weakening the secondary bonds, i.e., Van der Waals forces, between the rubber macromolecules. This composition for manufacturing inner liners also has an excellent adhesion to tire bodies.

In the composition of graphene oxide/rubber, the amount of graphene oxide is 0.1-30 phr (phr in a unit defined as 1 weigh part of graphene oxide with respect to 100 weight parts of rubber, and the 100 weight parts of rubber contain solid rubber and reactive rubber in a weight ratio of from 99:1 to 50:50). Graphene oxide forms an air-impermeable layer that reduces the air permeability of the composition of graphene oxide/rubber. In this invention, graphene oxide is thoroughly peeled and dispersed as a single layer or a few layers.

The reactive rubber in this invention contains reactive functional groups. The reactive functional groups may be positively charged groups, amine groups, carboxyl groups, etc., which may be located on the main chain, side chains, or chain terminals of the reactive rubber. The embodiments of the reactive rubber include carboxylated styrene-butadiene rubber, chloroprene rubber, carboxylated chloroprene rubber, carboxylated nitrile rubber, polybutadiene, carboxylated polybutadiene, polyisobutylene, polyisoprene, and rubbers containing an onium group that is represented as -MR (M is N, S, P, or

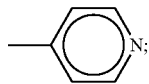

R is H, an alkyl group, an aryl group, or an allyl group).

The solid rubber in this invention has a molecular weight of higher than 10000 and undergoes vulcanization or cross-linking as a whole. Embodiments of the solid rubber include styrene-butadiene copolymers; isoprene- or acrylonitrile-butadiene copolymers; polybutadiene; polyisobutylene; polyisoprene; butadiene-, styrene-, or acrylonitrile-isoprene copolymers; ethylene-propylene-butadiene copolymers; and natural rubber.

The thermoplastic resin in this invention is polyethylene (PE), polyvinyl chloride (PVC), polystyrene (PS), polyamide (PA), polyoxymethylene (POM), polycarbonate (PC), polyphenylene ether, or polysulfone.

The weight ratio of the composition of graphene oxide/rubber with respect to the epoxy natural rubber or thermoplastic resin is from 9:1 to 1:1. This weight ratio can be adjusted in accordance with the content of the graphene oxide in the composition of graphene oxide/rubber so as to adjust the properties of the composition for manufacturing inner liners.

The preparation of the composition for manufacturing inner liners is described below.

1) the composition of graphene oxide/rubber is prepared as follows:
A) graphite oxide is dispersed in deionized water and then is ultrasonicated to obtain a homogeneous hydrosol of graphene oxide having a solid content of less than 5 wt %. Latex of reactive rubber (with a solid content of less than 60 wt %) is added to the hydrosol of graphene oxide and is then ultrasonicated or stirred to obtain a homogenous mixture. This mixture is further mixed with a rubber latex so as to achieve compatibilization of the reactive rubber within the solid rubber and to obtain a stable mixture emulsion of the composition of graphene oxide/rubber. Next, flocculant is added into the mixture emulsion to induce flocculation thereof, and the obtained floc is dried in a blast drying oven to obtain a composition of graphene oxide/rubber; or
B) graphite oxide is dispersed in deionized water and then is ultrasonicated to obtain a homogeneous hydrosol of graphene oxide having a solid content of less than 5 wt %. Latex of reactive rubber (with a solid content of less than 60 wt %) is added to the hydrosol of graphene oxide and is then ultrasonicated or stirred to obtain a homogenous mixture. Solid is collected from the mixture via vacuum filtration or filter press and is then dried in a blast drying oven. The dried solid is mixed with a solid dry rubber in a two roll mixing mill to achieve compatibilization of the reactive rubber within the solid rubber and to obtain a composition of graphene oxide/rubber.

2) two-phase mixing of the composition of graphene oxide/rubber with epoxy natural rubber or thermoplastic resin is carried out as follows:
A) two-phase mixing of the composition of graphene oxide/rubber with epoxy natural rubber: the composition of graphene oxide/rubber is mixed with epoxy natural rubber and additional additives in a two roll mixing mill to obtain a composition containing the composition of graphene oxide/rubber as a continuous phase and the epoxy natural rubber as a dispersed phase.
B) two-phase mixing of the composition of graphene oxide/rubber with thermoplastic resin: the composition of graphene oxide/rubber is mixed with thermoplastic resin and is then melted to obtain a mixture of rubber and plastic. The melted mixture of rubber and plastic is mixed with additional additives in a two roll mixing mill to obtain a composition containing the composition of graphene oxide/rubber as a continuous phase and the thermoplastic resin as a dispersed phase.

The graphene oxide/polymer composition of this invention can be formed into inner liners or inner tubes of tires by conventional processing techniques such as extrusion or calendering.

DETAILED DESCRIPTION OF THE EMBODIMENTS

Embodiment 1

1 g graphite oxide is dispersed and ultrasonicated in 100 g water to obtain a hydrosol of graphene oxide having a solid content of 1 wt %. The hydrosol of graphene oxide is mixed and stirred with 10 g latex of reactive rubber (latex of butadiene-vinyl pyridine rubber having a solid content of 40 wt %) to obtain a mixture of graphene oxide/butadiene-vinyl pyridine rubber latex. The mixture is then mixed with 480 g latex of styrene-butadiene copolymer (styrene-butadiene rubber, SBR, with a solid content of 20 wt %). The reactive rubber (butadiene-vinyl pyridine rubber) and the solid rubber (SBR) achieve compatibilization in liquid state and form a stable emulsion of graphene oxide/rubber. 100 mL 1% calcium chloride solution is added to the emulsion of graphene oxide/rubber to induce flocculation, and the produced floc is dried in a blast drying oven at 50° C. for 24 h to obtain a composition of graphene oxide/rubber. This composition of graphene oxide/rubber is mixed with 10 g epoxy natural rubber having an epoxide content of 10% and additional additives (5 weight parts of zinc oxide, 2 weigh parts of stearic acid, 1.5 weight parts of accelerator CZ, 0.2 weight part of accelerator M, 2 weight parts of antiager 4010NA, and 2.5 weight parts of sulfur) in a two roll mixing mill to obtain a composition containing the composition of graphene oxide/rubber as a continuous phase and epoxy natural rubber as a dispersed phase. In the final product, the content of graphene oxide is 1 phr, and the content of epoxy natural rubber is 10 phr. In X-ray diffraction measurement, the composition does not show the characteristics peaks of graphene oxide, indicating that the graphene oxide in the composition is thoroughly peeled. Measurement of transmission electron microscopy (TEM) clearly shows a two-phase structure of the composition of graphene oxide/rubber and epoxy natural rubber. The graphene oxide is uniformly dispersed in the phase of SBR containing butadiene-vinyl pyridine rubber and is not observed in the phase of epoxy natural rubber. In dynamic mechanical thermal analysis determining the glass transition temperature of the composition, the main loss peak (the maximum tan δ) of the composition of graphene oxide/rubber appears at −32.9° C., and the main loss peak (the maximum tan δ) of the epoxy natural rubber appears at 11.2° C. In contrast, the main loss peak of SBR that does not containing graphene oxide appears at −31° C., and the main loss peak of epoxy natural rubber is at 11.7° C. This indicates that graphene oxide promotes the flexibility of the graphene oxide/polymer composition.

The graphene oxide/polymer composition is formed into a film with a thickness of approximately 0.6 mm by a rolling mill at 135° C. The mechanical properties of the film tested according to the national standards are shown in Table 1. Air permeability of the film is determined by a gas tightness detector at 25° C. in a relative humidity of 0% by using nitrogen as the diffusing gas. The diffusion rate of nitrogen of the graphene oxide/polymer composition is $1.47 \times 10^{-17}$ $m^2 \cdot Pa^{-1} \cdot s^{-1}$. In the same condition, SBR filled with 60 weight parts of clay has a diffusion rate of nitrogen of $2.7 \times 10^{-17}$ $m^2 \cdot Pa^{-1} \cdot s^{-1}$, which is more than twice that of the graphene oxide/polymer composition.

Embodiment 2

A graphene oxide/polymer composition is prepared by the same method as that of Embodiment 1 except that the epoxide content of the epoxy natural rubber is 30%. The diffusion rate of nitrogen of this graphene oxide/polymer composition is $1.32 \times 10^{-17}$ $m^2 \cdot Pa^{-1} \cdot s^{-1}$. The main loss peak of the composition of graphene oxide/rubber appears at −33.4° C., and the main loss peak of the epoxy natural rubber appears at 12.3° C. The mechanical properties of the embodiment are listed in Table 1.

Embodiment 3

A graphene oxide/polymer composition is prepared by the same method as that of Embodiment 1 except that the epoxide content of the epoxy natural rubber is 50%. The diffusion rate of nitrogen of this graphene oxide/polymer composition is $1.05 \times 10^{-17}$ $m^2 \cdot Pa^{-1} \cdot s^{-1}$. The main loss peak of the composition of graphene oxide/rubber appears at −34.1° C., and the main loss peak of the epoxy natural rubber appears at 12.9° C. The mechanical properties of the embodiment are listed in Table 1.

TABLE 1

The mechanical properties of the graphene oxide/polymer compositions

| Sample | Shore A hardness | Tensile stress at a given elongation of 100% (MPa) | Tensile stress at a given elongation of 300% (MPa) | tensile strength (MPa) | elongation at break (%) | permanent set (%) | tear strength (kN/m) |
|---|---|---|---|---|---|---|---|
| Embodiment 1 | 52 | 5.7 | 9.8 | 12.2 | 458 | 8 | 36.4 |
| Embodiment 2 | 56 | 5.8 | 8.7 | 11.9 | 420 | 8 | 35.7 |
| Embodiment 3 | 58 | 5.2 | 8.6 | 10.6 | 389 | 8 | 34.9 |

Embodiment 4

A graphene oxide/polymer composition containing 0.5 phr graphene oxide, 20 phr amine-terminated butadiene-acrylonitrile oligomer, 80 phr styrene-butadiene copolymer (SBR-5200), and 30 phr epoxy natural rubber is prepared as follows: 0.5 g graphite oxide is dispersed and ultrasonicated in 100 g water to obtain a hydrosol of graphene oxide having a solid content of 0.5 wt %. The hydrosol of graphene oxide is mixed and stirred with 10 g amine-terminated butadiene-acrylonitrile oligomer so that the graphene oxide reacts with the reactive rubber. After the mixing of the graphene oxide and the reactive rubber, 400 g latex of styrene-butadiene copolymer (with a solid content of 20 wt %) is added to the mixture to form a stable emulsion of graphene oxide/rubber and to achieve compatibilization in liquid state. 100 mL 1% dilute sulfuric acid solution is added to the emulsion to induce flocculation, and the produced floc is dried in a blast drying oven at 50° C. for 24 h to obtain a composition of graphene oxide/rubber. This composition of graphene oxide/rubber is mixed with 30 g epoxy natural rubber having an epoxide content of 30% in a two roll mixing mill to obtain a composition containing the composition of graphene oxide/rubber as a continuous phase and epoxy natural rubber as a dispersed phase.

The graphene oxide/polymer composition is formed into a film with a thickness of approximately 0.6 mm by a rolling mill at 135° C. This film is soft and flexible at room temperature, and has a diffusion rate of nitrogen of $1.56 \times 10^{-17}$ $m^2 \cdot Pa^{-1} \cdot s^{-1}$ measured in the same condition as that of Embodiment 1.

Embodiment 5

1 g graphite oxide is dispersed and ultrasonicated in 100 g water to obtain a hydrosol of graphene oxide having a solid content of 1 wt %. The hydrosol of graphene oxide is mixed and stirred with 100 g latex of butadiene-vinyl pyridine rubber (with a solid content of 40 wt %) to obtain a mixture of graphene oxide/butadiene-vinyl pyridine rubber latex. The mixture is then mixed with 100 g latex of natural rubber (with a solid content of 60 wt %) to form an emulsion of graphene oxide/rubber. The reactive rubber (butadiene-vinyl pyridine rubber) and the solid rubber (natural robber) achieve compatibilization in liquid state and form a stable emulsion of graphene oxide/rubber. 100 mL 1% sodium sulfate solution is added to the emulsion of graphene oxide/rubber to induce flocculation, and the produced floc is dried in a blast drying oven at 50° C. for 24 h to obtain a composition of graphene oxide/rubber. This composition of graphene oxide/rubber is mixed with 20 g polystyrene via melting in a screw-propelled plastic injection machine to obtain a composition of rubber and plastic.

The graphene oxide/polymer composition is formed into a film with a thickness of approximately 0.6 mm by a rolling mill at 150° C. Air permeability of the film is determined by a gas tightness detector at 25° C. in a relative humidity of 0% by using nitrogen as the diffusing gas. The diffusion rate of nitrogen of the graphene oxide/polymer composition is $0.95 \times 10^{-17} m^2 \cdot Pa^{-1} \cdot s^{-}$.

Embodiment 6

The graphene oxide/polymer composition of Embodiment 5 is mixed with 5 phr of zinc oxide, 2 phr of stearic acid, 1.5 phr of accelerator CZ, 0.2 phr of accelerator M, 2 phr of antiager 4010NA, and 2.5 phr of sulfur in a two roll mixing mill, and is then molded in a belt vulcanization machine at 150° C. to form vulcanized films with a thickness of 1 mm.

The graphene oxide/polymer composition containing a curing agent is formed into an uncured film with a thickness of approximately 0.6 mm in a two roll mixing mill. SBR-5200 is mixed with an equal amount of rubber additives and is formed into an uncured film with a thickness of approximately 1.4 mm in a two roll mixing mill. The two films are calendered together and molded in a molding machine for an optimized curing time. After vulcanization, the two films cannot be separated, indicating an excellent adhesion of the graphene oxide/polymer composition to the rubber.

Embodiment 7

30 g graphite oxide is dispersed and ultrasonicated in 1000 g water to obtain a hydrosol of graphene oxide having a solid content of 3 wt %. 1000 g of the hydrosol of graphene oxide is mixed and stirred with 50 g latex of reactive rubber (latex of carboxylated styrene-butadiene rubber with a solid content of 40 wt %) to obtain an emulsion of graphene oxide/carboxylated styrene-butadiene rubber latex. Solid is collected from the emulsion via filter press and is then dried in a blast drying oven at 80° C. The dried product is mixed with a solid dry rubber (styrene-butadiene rubber) in a two roll mixing mill to carry out compatibilization of the reactive rubber in the solid rubber and to obtain a composition of graphene oxide/rubber. The composition of graphene oxide/rubber is mixed with 10 g poly(hexamethylene adipamide) via melting in a screw-propelled plastic injection machine to obtain a composition of rubber and plastic.

The graphene oxide/polymer composition is formed into a film with a thickness of approximately 0.6 mm by a rolling mill at 150° C. Air permeability of the film is determined by a gas tightness detector at 25° C. in a relative humidity of 0% by using nitrogen as the diffusing gas. The diffusion rate of nitrogen of the graphene oxide/polymer composition is $0.63 \times 10^{-17} m^2 \cdot Pa^{-1} \cdot s^{-1}$.

Embodiment 8

The graphene oxide/polymer composition of Embodiment 7 is mixed with 5 phr of zinc oxide, 2 phr of stearic acid, 1.5 phr of accelerator CZ, 0.2 phr of accelerator M, 2 phr of antiager 4010NA, and 2.5 phr of sulfur in a two roll mixing mill, and is then molded in a belt vulcanization machine at 150° C. to form vulcanized films with a thickness of 1 mm.

The graphene oxide/polymer composition containing a curing agent is formed into an uncured film with a thickness of approximately 0.8 mm in a two roll mixing mill. SBR-5200 is mixed with an equal amount of rubber additives and is formed into an uncured film with a thickness of approximately 1.2 mm in a two roll mixing mill. The two films are calendered together and molded in a molding machine for an optimized curing time. After vulcanization, the two films cannot be separated, indicating an excellent adhesion of the graphene oxide/polymer composition to the rubber.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A graphene oxide/polymer composition for manufacturing inner liners and inner tubes of tires, the graphene oxide/polymer composition comprising:
   a continuous phase, the continuous phase comprising a composition of graphene oxide/rubber, the composition of graphene oxide/rubber comprising graphene oxide, a reactive rubber, and a solid rubber; and
   a dispersed phase, the dispersed phase comprising an epoxy natural rubber or a thermoplastic resin.

2. The graphene oxide/polymer composition of claim 1, wherein:
   the graphene oxide is in a content of 0.1-30 phr, phr is defined as 1 weigh part of graphene oxide with respect to 100 weight parts of rubber, and the rubber comprises the reactive rubber and the solid rubber.

3. The graphene oxide/polymer composition of claim 1, wherein:
   a weight ratio of the solid rubber to the reactive rubber is from 99:1 to 50:50.

4. The graphene oxide/polymer composition of claim 1, wherein the reactive rubber is amine-terminated rubber or carboxy-terminated rubber.

5. The graphene oxide/polymer composition of claim 1, wherein:
   the reactive rubber comprises an onium group, the onium group is represented as -MR, M is N, S, P, or

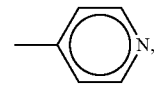

and R is H, an alkyl group, an aryl group, or an allyl group.

6. The graphene oxide/polymer composition of claim 1, wherein the solid rubber is selected from: styrene-butadiene copolymers; isoprene- or acrylonitrile-butadiene copolymers; polybutadiene; polyisobutylene; polyisoprene; butadiene-, styrene-, or acrylonitrile-isoprene copolymers; ethylene-propylene-butadiene copolymers; or natural rubber.

7. The graphene oxide/polymer composition of claim 1, wherein the dispersed phase is an epoxy natural rubber having an epoxide content of 10-50%.

8. The graphene oxide/polymer composition of claim 1, wherein the thermoplastic resin is polyethylene, polyvinyl chloride, polystyrene, polyamide, polyoxymethylene, polycarbonate, polyphenylene ether, or polysulfone.

9. The graphene oxide/polymer composition of claim 1, wherein a weight ratio of the composition of graphene oxide/rubber with respect to the epoxy natural rubber or the thermoplastic resin is from 9:1 to 1:1.

10. A method for preparing the graphene oxide/polymer composition of claim 1, comprising:
  1) dispersing and ultrasonicating graphite oxide in water to obtain a hydrosol of graphene oxide;
  2) mixing the hydrosol of graphene oxide of 1) with the reactive rubber to obtain a mixture;
  3) adding the solid rubber to the mixture of 2) to obtain a composition of graphene oxide/rubber, the solid rubber is rubber latex or dry rubber; and
  4) mixing the composition of graphene oxide/rubber with the epoxy natural rubber or the thermoplastic resin to obtain the graphene oxide/polymer composition.

\* \* \* \* \*